(12) United States Patent  
Huang

(10) Patent No.: US 6,664,755 B1  
(45) Date of Patent: Dec. 16, 2003

(54) INTELLIGENT ELECTRIC MOTOR

(76) Inventor: Qun Huang, Xin 1-413, Mechanical College No. 2 Nei, Jintai West Road, Chaoyang District, Beijing 100026 (CN)

( * ) Notice: Subject to any disclaimer, the term of this patent is extended or adjusted under 35 U.S.C. 154(b) by 0 days.

(21) Appl. No.: 10/049,564

(22) PCT Filed: Aug. 15, 2000

(86) PCT No.: PCT/CN00/00234  
§ 371 (c)(1),  
(2), (4) Date: Apr. 8, 2002

(87) PCT Pub. No.: WO01/13509  
PCT Pub. Date: Feb. 22, 2001

(30) Foreign Application Priority Data

Aug. 16, 1999 (CN) .................................. 99217966 U

(51) Int. Cl.⁷ ................................................. H02D 3/14
(52) U.S. Cl. ..................... 318/721; 318/254; 318/138; 318/439; 318/434; 318/433; 318/376; 318/379
(58) Field of Search ................. 318/254, 433, 318/434, 138, 439, 376, 379, 721

(56) References Cited

U.S. PATENT DOCUMENTS 5,604,412 A    2/1997   Okada et al.

FOREIGN PATENT DOCUMENTS

CN         1050652          4/1991

OTHER PUBLICATIONS

Copy of International Search Report for PCT/CN00/00234 completed Sep. 20, 2000.

*Primary Examiner*—Karen Masih  
(74) *Attorney, Agent, or Firm*—Alston & Bird LLP

(57) ABSTRACT

In an intelligent electric motor, the rotating speed and performance of a conventional electric motor is changed based on a means controlled by a computer, and the means is installed in the housing of the intelligent electric motor. For example, in the intelligent AC motor, the three-phase power is connected to the three-phase stator winding by three groups of control gates. All of the gates are switched on or off by a signal from the control means. When each of the three groups of control gates is switched on sequentially, the three-phase power is connected to the three-phase stator winding of the three-phase intelligent electric motor at the speed $\delta$ in turn, so that the speed of the rotating magnetic field of the intelligent electric motor $n_0$ is increased by a sped $\delta$. Therefore, the actual speed of the motor, $n'_0$, is equal to $n_0 \pm \delta$, so the speed and performance of the motor is changed.

10 Claims, 2 Drawing Sheets

INTELLIGENT ELECTRIC MOTOR

FIELD OF THE INVENTION

The present invention relates generally to electric motors, such as three-phase synchronous, three-phase asynchronous, single-phase alternating-current (AC) electric motors and direct-current (DC) electric motors.

BACKGROUND OF THE INVENTION

In a conventional electric motor, it is necessary to change the voltage or frequency of the power supply in order to adjust the speed of the motor. Additionally, the rotating speed of a conventional AC electric motor cannot be faster than the synchronous speed corresponding to the power frequency. Accordingly, the rotating speed range of a conventional AC electric motor is not large enough, and it is also difficult to govern its speed. The configuration of a conventional DC electric motor is complex, and its performance need to be improved.

OBJECT OF THE INVENTION

It is an object of the present invention to provide an intelligent AC electric motor and an intelligent DC electric motor. The rotating speed of the intelligent AC electric motor can be greater than the synchronous speed corresponding to the power frequency, so that the speed range is enlarged and the speed control is improved. The intelligent DC electric motor is provided with a simpler configuration and better performance.

BRIEF SUMMARY OF THE INVENTION

The object of the present invention is achieved by the addition of a control gate circuit structure to a conventional electric motor.

The intelligent motor may be divided into an intelligent AC electric motor and an intelligent DC electric motor. Its operating performances, such as rotating speed and the like, are changed by various control means including a computer. The intelligent electric motor consist of a relevant motor and a non-contacting control gate circuit, and all the means are assembled into the housing of the intelligent electric motor.

Preferably, the control gate circuit in an intelligent AC electric motor, including an intelligent synchronous electric motor, an intelligent asynchronous electric motor, an intelligent single-phase electric motor and the like, causes the stator windings of the electric motor to be switched to the phase sequences of the power-supply in turn and periodically according to a predetermined operation mode. The objects of changing the motors performance and governing its rotating speed can be accomplished via an additional rotating magnetic field, $\pm\delta$ that is generated by such switching.

Preferably, the control gate circuit in an intelligent DC electric motor causes the stator windings of the electric motor to be switched to the power-supply polarities in turn and periodically according to a predetermined operation mode. One additional rotating magnetic field, which is generated by switching the stator windings of the electric motor to the power-supply polarities in turn and periodically, can achieve the objects of changing the electric motor's performance and governing the rotating speed of the electric motor.

Preferably, the intelligent AC electric motor employs a cage rotor such that asynchronous operation of the intelligent AC electric motor can be implemented.

Preferably, the intelligent AC electric motor employs the permanent magnet rotor or the direct-current exciting rotor of a synchronous motor, so that synchronous operation of the intelligent DC motor can be implemented.

DETAILED DESCRIPTION OF THE INVENTION

Figure 1:
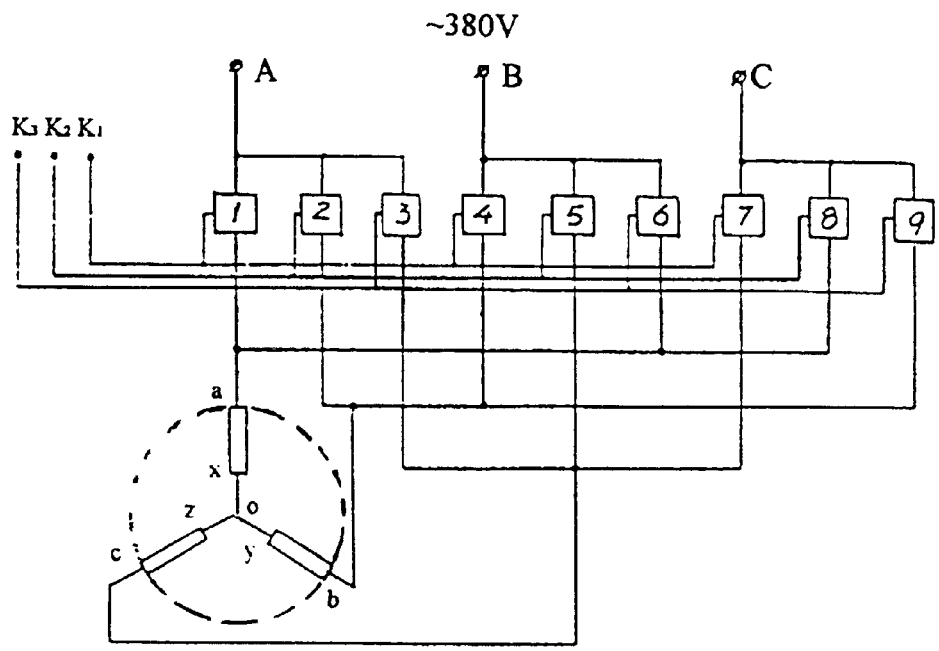
FIG. 1 shows a schematic diagram of the intelligent alternating current (AC) electric motor.
Figure 2:
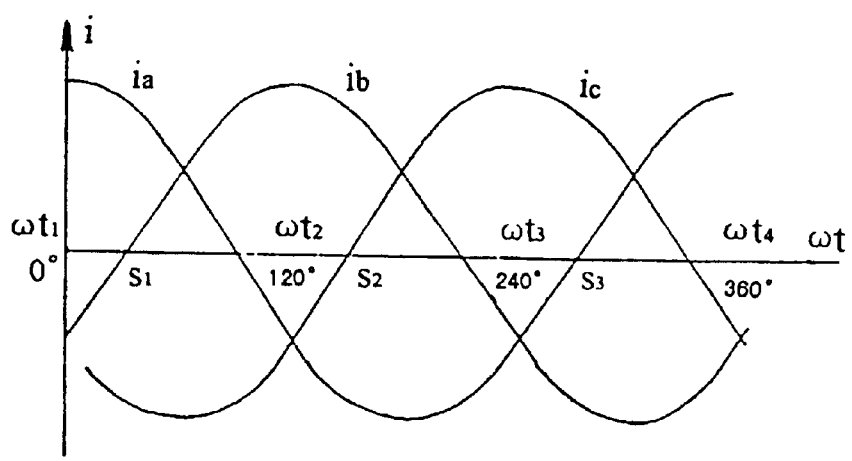
FIG. 2 is a graph illustrating the waveform of three-phase current in a stator.
Figure 3:
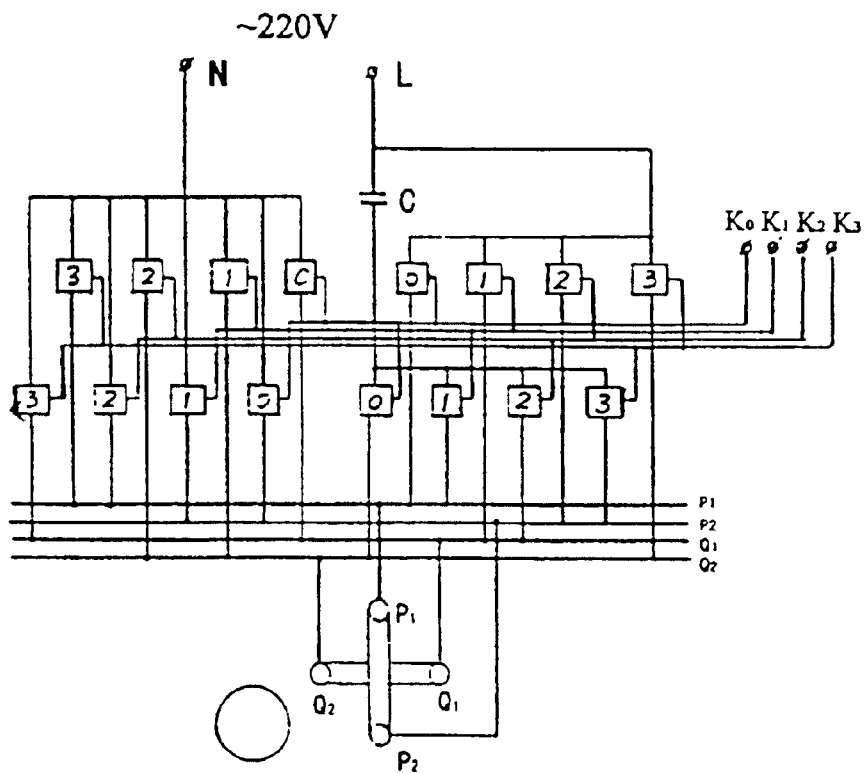
FIG. 3 shows a schematic diagram of the intelligent single-phase electric motor.
Figure 4:
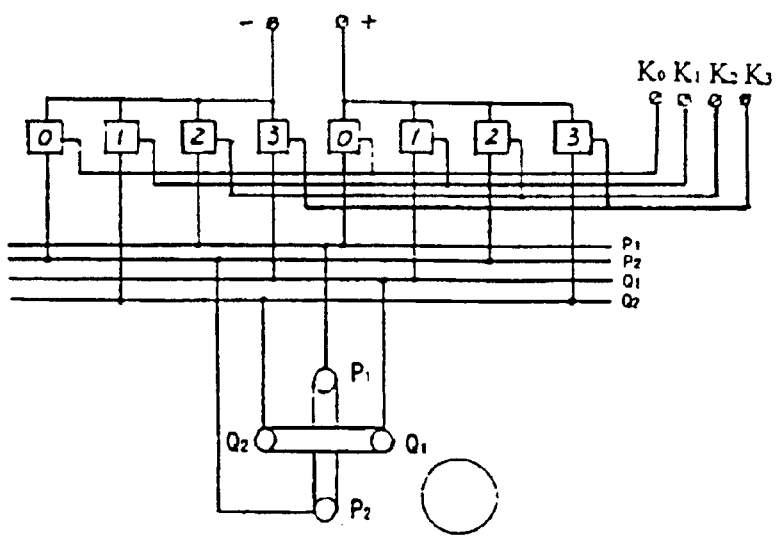
FIG. 4 shows a schematic diagram of the intelligent direct-current electric motor.

With reference to the attached drawings, the preferred embodiment of the present invention is described in detail hereafter. Refer to FIGS. 1, 2, 3 and 4. FIG. 1 is a schematic diagram of the intelligent alternating current (AC) electric motor. As shown in FIG. 1, the three-phase stator windings ax, by and cz are connected into a Y-connection. Blocks 1 to 9 indicate control gates, which are switched on or off according to signals from a control means. When the control gates are periodically closed in turn, the three-phase power is sequentially switched to the three-phase stator windings at the rotating speed $\delta$ cyclically. Therefore, the rotating magnetic field of the intelligent electric motor is provided with such a rotating speed that the rotating speed $\delta$ is added to the rotating speed $n_0$ of the conventional rotating magnetic field, so that the rotating speed of the electric motor can be governed. FIG. 2 shows the waveform curves of three-phase current in a stator of the intelligent electric motor. FIG. 3 is a schematic diagram of the intelligent single-phase electric motor. As shown in FIG. 3, $P_1$-$P_2$ and $Q_1$-$Q_2$ indicate two stator windings respectively, which are laid at right angles with each other, and C denotes a phase-shift capacitor. When the control gates are periodically turned off in turn, the single-phase power is sequentially switched to the two stator windings at the rotating speed $\delta$ cyclically. As a result, the rotating magnetic field of the intelligent single-phase motor is provided with such a rotating speed that the rotating speed $\delta$ is added to the rotating speed $n_0$ of the original rotating magnetic field, so that the rotating speed of the intelligent single-phase motor can be governed. A schematic diagram of the intelligent direct-current electric motor is shown in FIG. 4, in which $P_1$-$P_2$ and $Q_1$-$Q_2$ indicate two stator windings set at right angles with each other. When the control gates are periodically closed in turn, the DC power is sequentially switched to the two stator windings at the rotating speed $\delta$ cyclically. As a result, the rotating speed $\delta$ is added to the fixed magnetic field of the intelligent single-phase motor, so that speed governing can be achieved.

A control gate circuit structure is added to a conventional electric motor to achieve an intelligent electric motor.

1. For example, although intelligent electric motors have various types, they are all based on conventional motors such as coiling-type synchronous motors, and cage-type asynchronous motors. The circuit of an intelligent AC motor is shown in FIG. 1. The A-phase power is connected in the outer ends a, b and c, of the stator winding of the three-phase electric motor, through control gates 1, 2 and 3 respectively. The B-phase power is connected to the ends b, c and a through control gates 4, 5 and 6 respectively. The C-phase power is connected to the ends c, a and b through control gates 7, 8 and 9 respectively. The inner ends x, y and z of the stator winding of the three-phase electric motor are connected to one point o. Each control gate is turned on or off according to whether a control signal is received from the control means.

When control gates 1, 4 and 7 are switched on, three-phase power A, B and C are respectively connected to the outer ends, a, b and c, of the three-phase stator winding of the motor. The intelligent electric motor operates continuously in the same way as a conventional three-phase motor with a common Y-connected stator winding. The speed of the rotating magnetic field for the intelligent motor is up to $n_0$. There is no difference between the performance of the intelligent motor and of the common three-phase motor with a Y-connected stator winding.

However, if it is supposed that the stator of the intelligent electric motor, switching on the three-phase power, is rotating in the direction of rotation of the rotating magnetic field at the speed $\delta$, the actual speed of the rotating magnetic field becomes $n_0+\delta$. The actual speed of said rotating magnetic field, $n_0+\delta$, is higher than the synchronous rotating speed $n_0$ relevant to power frequency. Based on the above result, it is possible that the intelligent AC electric motor can govern the rotating speed thereof over a larger range.

By controlling the control gates 1 through 9, the stator of the intelligent electric motor, switching on the three-phase power, can be rotated in the direction of rotation of the rotating magnetic field at the speed $\delta$.

FIG. 2 shows the waveform of three-phase current, with the normal three-phase power A, B and C input to the three-phase electric motor at the common Y-connected stator winding when control gates 1, 4 and 7 are turned on. The current values in phases A, B and C are maximized at $\omega t_1=0°$, $\omega t_2=120°$, $\omega t_3=240°$ and the like. The maximums of the three-phase currents A, B and C for the stator winding ax\by\cz of the three-phase electric motor occur in the time sequence $t_1$, $t_2$, and $t_3$ sequentially, and cause the stator to revolve at the synchronous rotating speed $n_0$ in a clockwise direction spatially. It is confirmed in practice that the three-phase current can excite the rotating magnetic field at the speed $n_0$ and in the same rotating direction.

However, for the intelligent AC electric motor, the following control sequence is implemented:

(1) At the moment $S_1$ after $\omega t=0°$, the maximum current input into phase A through the control gate 1 switches the control gates 2, 5, and 8 on. Then, after revolving over an angle $\psi=120°$ (where $\psi$ is the displacement angle of the power shift) in the same rotating direction as the rotating magnetic field, power phases A, B and C are led into phase B, C and A of the winding respectively. The maximum current of phase B is not generated in phase B of the winding again, but occurs in phase C of the winding after passing= 120°.

(2) Hereafter, at the moment $S_2$ after $\omega t=120°$, the maximum current of phase B switches the control gates 3, 6, and 9 on. Then, after revolving over another angle $\psi$, for a total revolution of $2\psi$ or 240°, power phases A, B and C are led into phase C, A and B of the winding respectively. The maximum current of phase C is not generated in phase C of the winding again, but occurs in phase B of the winding after passing through an angle of $2\psi=240°$ in space.

(3) Then, at the moment $S_3$ after $\omega t=240°$, the maximum current of phase C makes the control gates 1, 4, and 7 switched on. Then, after revolving over another $\psi=120°$ once again, for a total revolution of $3\psi$ or 360°, power phases A, B and C are led into phase A, B and C of the winding respectively. After revolving over the angle $3\psi=360°$ in space, the maximum current of phase A occurs in phase A of the winding. That is, when the original rotating magnetic field has completed one rotation over 360°, the rotating magnetic field of the intelligent AC electric motor (termed as intelligent rotating magnetic field hereafter) has rotated through an angle of 720°. Therefore, the rotating speed of the intelligent rotating magnetic field, $n'_0$, is twice as fast as the original speed $n_0$ as a result of repeating the above control sequence as shown in the formula $n_0^1=n_0+\psi\times f_\psi/360°=2n_0$, where $f_\psi$ is the frequency of generating the shift angle $\psi$. Both $f_\psi$ and $\psi$ are varied with control signals sent from a computer to control the control gates. In other words, a computer intelligently controls the speed component $\psi\times f_\psi$ completely. Therefore, speed governing can be achieved by changing the parameters f and $\psi$.

Similarly, if the switching order of all the control gates is changed in such a way that the shift angle $\psi$ of power can shift in the reverse rotating direction to that of the rotating magnetic field, the rotating speed of the intelligent rotating magnetic field, $n'_0$, is lower than $n_0$. As a result, the motor rotating speed can be decreased.

Thus, the actual rotating speed of the intelligent AC electric motor may be greater than no, the synchronous rotating speed relevant to power frequency. Then, the ranges of the speed and speed governing are enlarged.

2. The single-phase electric motor can be also transformed into the intelligent single-phase electric motor by using a similar method, for an example of which the schematic diagram is shown in FIG. 3.

The single-phase electric motor includes two stator windings, $P_1$-$P_2$ and $Q_1$-$Q_2$, laid at right angles with each other in space. When the given control signals change in sequence, the relevant control gate is switched on, and the electric motor is changed as a relevant mode of connection, and then the power is shifted over an angle of 90°. The above-mentioned processes are shown in Table 1.

TABLE 1

| Control signals | Switching on control gate | The direction of switching capacitor shift power on winding | The direction of switching another power on the winding | The angle shifted by power rotating along with rotating magnetic field |
|---|---|---|---|---|
| $K_0$ | 0 | $Q_2$-$Q_1$ | $P_1$-$P_2$ | 0 |
| $K_1$ | 1 | $P_1$-$P_2$ | $Q_1$-$Q_2$ | +90° |
| $K_2$ | 2 | $Q_1$-$Q_2$ | $P_2$-$P_1$ | +90° |
| $K_3$ | 3 | $P_2$-$P_1$ | $Q_2$-$Q_1$ | +90° |

It is evident that if one signal of the control signals $K_0$ through $K_3$ is held on constantly, then an intelligent single-phase electric motor has the same wiring and performance as a conventional single-phase electric motor. The rotating speed of the rotating magnetic field $n'_0$ generated by connecting to single-phase power is equal to $n_0$.

As the control signals are given periodically in the order of $K_0$-$K_1$-$K_2$-$K_3$-$K_0$- and so on, the stator power of the electric motor is shifted clockwise in the order of control, and shifting angle $\psi$ is equal to 90°. Therefore, the rotating speed of the intelligent single-phase rotating magnetic field, $n''_0=n_0+\Delta n$, is greater than the synchronous rotating speed $n_0$, and motor rotating speed is increased.

As control signals are given periodically in the order of $K_0$-$K_1$-$K_2$-$K_3$-$K_0$- and so on, the stator power of the electric motor is shifted counter-clockwise in the order of control, and shifting angle $\psi$ is equal to −90°. Therefore, the rotating speed of the intelligent single-phase rotating magnetic field, $n''_0=n_0-\Delta n$, is less than the synchronous rotating speed $n_0$, and motor rotating speed is decreased.

The value of a parameter $\Delta n$ is determined by product of a shifting angle $\psi$ and a frequency $f_\psi$ generating the shift angle $\psi$ as shown in the formula $\Delta n=\psi \times f_\psi/360°$. Therefore, speed-governing can be achieved by changing the parameters $f_\psi$ and $\psi$.

3. The direct-current electric motor can be reconstructed as the intelligent DC electric motor according to the above-mentioned method, of which the schematic diagram is shown in FIG. 4.

The stator of the intelligent DC electric motor does not employ the armature mode any more, and a commutator is not needed. Hence, a cage rotor is put to use. The intelligent DC electric motor is provided with two stator windings, $P_1$-$P_2$ and $Q_1$-$Q_2$, having the same parameters and being laid at right angles with each other in space. When a control signal is supplied to control gates continuously, one of the control gates is kept on. The stator winding of the intelligent DC electric motor is in the unchanged wiring mode, and can generate the constant magnetic field by the DC exciting current. Thus, the rotating magnetic field of the intelligent DC electric motor is of the rotating speed $n_0=0$.

As the control signals are given periodically in the order of $K_0$-$K_1$-$K_2$-$K_3$-$K_0$- and so on, the DC exciting current periodically flows into the stator winding from $P_1$, $Q_1$, $P_2$, $Q_2$, $P_1$ and the like in sequence. Then, the magnetic field, generated by the DC exciting current, rotates its oriented axis to each central line of windings via turning $P_1P_2$ to $Q_1Q_2$, $P_2P_1$, $Q_2Q_1$, and $P_1P_2$ in sequence. Actually, the rotating magnetic field with the DC exciting current is established, and is of the rotating speed $n_0=\psi \times f_\psi/360°$. The rotating magnetic field makes the cage rotor operate asynchronous and rotate similarly. If the above-mentioned cage rotor is altered into the permanent magnet rotor or the direct-current exciting rotor of a synchronous motor, the synchronous operation of the intelligent DC motor can be implemented.

In a similar method to the above-mentioned, the rotating speed of the intelligent DC electric motor can be governed by changing the shifting angle $\psi$ and the frequency $f_\psi$, which generates the shift angle $\psi$. When the order of operating control signals is in inverted sequence, the intelligent DC electric motor can rotate in the opposite direction.

The preferential method for implementing the present invention includes specifying the control operation, conducting a control operation not only on each phase of winding but on each circle of winding, and performing control operations in a more equilibrated and successive way, which may result in the better effect on control operation.

Preferably, control signals are transmitted by radio to simplify the structure of the electric motor.

It is preferred that the type of electronic product is properly selected for use as a control gate by considering the different operating features and demands. Electronic elements, for example, transistor GTR, gate turn-off thyristor GTO, static induction thyristor SITH, power MOSFET, SIT static induction unipolar transistor, MOS transistor MCT, MOS transistor MGT, insulated gate transistor IGT and the like, can be gathered into the integrated circuit, and put into the housing of the electric motor. Therefore, the integration of the control gate circuit and the electric motor is completed.

Preferably, a computer provides control signals for the intelligent electric motor. The intelligent electric motor can be accomplished by taking advantage of the robust functions of a computer completely.

In comparison with the prior art, the intelligent electric motor according to the invention has the following advantages:

1. Good control performance. The control operations of increasing-decreasing speed, clockwise-counterclockwise turning, and starting-braking can be implemented without the need for other specific equipment.
2. Large speed range. The speed of the rotating field of the intelligent electric motor can be greater than the synchronous rotating speed, not being limited to $n_0$.
3. Good electric property, low starting shock, large dynamic torque, quick transition process, and lower power consumption.
4. The intelligent DC electric motor is simple in structure, and then the control for speed governing is simple and easy.
5. A control circuit is installed into the intelligent electric motor, which make various units of the intelligent electric motor able to be controlled individually.

What is claimed is:

1. An intelligent electric motor and control system capable of operating either as an intelligent AC electric motor system or an intelligent DC electric motor system, comprising:

an electric motor having a plurality of stator windings, a rotor, and a plurality of power terminals;

a plurality of control gate circuits installed in the stator winding of the electric motor; and a control unit for outputting control signals to control said plurality of control gate circuits, wherein said plurality of control gate circuits alternately and periodically switch each of said plurality of stator windings of said electric motor to connect each of said plurality of power terminals having different phase sequences and phase angles of alternating-current power supply or to each of said plurality of power terminals having different polarities of direct-current power supply in response to said control signals from said control unit, so that an additional rotating magnetic field is added to an original rotating magnetic field generated by the power supply for adjusting the rotation speed and changing operation properties of the electric motor.

2. The intelligent electric motor and control system according to claim 1, wherein when said intelligent electric motor is an intelligent DC electric motor, said rotor of said intelligent DC electric motor is a cage rotor for implementing asynchronous operation.

3. The intelligent electric motor and control system according to claim 1, wherein when said intelligent electric motor is an intelligent DC electric motor, said rotor of said intelligent DC electric motor is one of a permanent magnet rotor and a direct-current exciting rotor for synchronous operation.

4. The intelligent electric motor and control system according to claim 1, wherein each of said plurality of control gate circuits is connected to the stator winding; and said plurality of control gate circuits and the electric motor are installed into one common housing to form an integrated device.

5. The intelligent electric motor and control system according to claim 1, wherein each of said plurality of control gate circuits is connected to the stator winding; and said plurality of control gate circuits is made into a separate unit as a control gate component, which is separate from the electric motor.

6. The intelligent electric motor and control system according to claim 1, wherein at least one of said plurality of control gate circuits is selected from the group consisting of transistor GTR, gate turn-off thyristor GTO, static induction thyristor SITH, power MOSFET, SIT static induction unipolar transistor, MOS transistor MCT, MOS transistor MGT, and insulated gate transistor IGT, and used in said control gate circuits.

7. The intelligent electric motor and control system according to claim 1, wherein said motor is operated by using a three-phase AC power supply, and comprises one of an intelligent electric motor having a Y-connection stator winding and an intelligent electric motor having Δ-connection (delta-connection) stator winding; said intelligent electric motor of Y-connection stator winding having nine control gates, wherein an A-phase of the power supply is connected to stator windings a, b and c of the three-phase electric motor through a first set of control gates 1–3 respectively, a B-phase of the power supply is connected to stator windings b, c and a through a second set of control gates 4–6 respectively, a C-phase of the power supply is connected to stator windings c, a and b through a third set of control gates 7–9 respectively, and the terminal ends of the stator winding of the three-phase electric motor are connected into one point, wherein a relevant one of said control gates is switched on as a control signal is input, and all control gates are switched off when no control signal is input;

when said control signals are input to said control gates in a predetermined operation mode, the stator windings are switched between different phase sequences of the three-phase AC power source and between different phase angles, so that an additional rotating magnetic field, capable of controlling its rotating speed and direction, is established in the stator for adjusting the rotation speed of said electric motor and changing other operation properties of said electric motor.

8. The intelligent electric motor and control system according to claim 1, wherein said motor is operated by using a single-phase AC power supply, wherein a live wire L of the AC power supply is connected to ends P1, Q1, P2, and Q2 of the stator windings through four control gates 0–3 respectively, a live wire L is also connected to ends Q1, P2, Q2, and P1 of the stator windings through capacitors and four other control gates 0–3 respectively, so that phase differences are formed between ends, and the shift angle of a single-phase rotating magnetic field is generated; and a ground wire N of the AC power supply is connected to the ends P1, Q1, P2 and Q2, and Q1, P2, Q2 and P1 corresponding to two sets of control gates of eight control gates through two other sets of control gates 0-3 of eight control gates respectively, so that these windings could be turned on, wherein four control gates 0 are switched on or off by the control signal K0, four control gates 1 are switched on or off by the control signal K1, four control gates 2 are switched on or off by the control signal K2, four control gates 3 are switched on or off by the control signal K3, a relevant one of said control gates is switched on as a control signal is input, and all control gates are switched off when no control signal is input, when control signals K0, K1, K2, and K3 are input to said control gates in the predetermined operation mode, the stator windings are switched between different phase angles of the signal-phase AC power supply correspondingly, so that an additional rotating magnetic field, capable of controlling its rotating speed and direction, is established in the stator for adjusting the rotation speed of said electric motor and changing operation properties of said electric motor.

9. The intelligent electric motor and control system according to claim 2, wherein a positive pole of a power source is connected to ends P1, Q1, P2, and Q2 of the stator windings of the electric motor through a first set of control gates M0–M3 respectively; a negative pole of a power source is connected to ends P2, Q2, P1, and Q1 through a second set of control gates m0–m3 respectively;

a control gate 0 is switched on or off by a control signal K0, a control gate 1 is switched on or off by a control signal K1, a control gate 2 is switched on or off by a control signal K2, a control gate 3 is switched on or off by a control signal K3; a relevant control gate is switched on as a control signal is input, and all control gates are switched off when no control signal is input; and when control signals K0, K1, K2, and K3 are input to said control gates in a predetermined operation mode, the stator windings are switched between different polarity terminals of the DC power source correspondingly, so that a direct-current rotating magnetic field, capable of controlling its rotating speed and direction, is established in the stator for adjusting the rotation speed of said electric motor and changing other operation properties of said electric motor.

10. A method for controlling the rotation speed and other operation properties of an electric motor, comprising the steps of first, providing phase-change signals for applying to the stator winding of the electric motor and installing control gate circuits in the stator windings of the electric motor; and second, in response to the control signals transmitted from a control unit, the control gate circuits switching the stator windings of said electric motor between different phase sequences and phase angles of alternating-current power source, or the polarities of direct-current power source in a predetermined operation mode, so that an additional rotating magnetic field is added to the original rotating magnetic field generated by AC power supply, thereby adjusting the rotation speed of said electric motor and changing other operation properties of said electric motor.

* * * * *